Patented Jan. 1, 1929.

1,697,722

UNITED STATES PATENT OFFICE.

CAMILLE DEGUIDE, OF ENGHIEN, FRANCE.

PROCESS FOR RECOVERING BARIUM AS BARIUM CARBONATE FROM BARIUM SILICATES.

No Drawing. Application filed March 25, 1926, Serial No. 97,456, and in France April 3, 1925.

The present invention relates to a process for recovering barium as barium carbonate from the waste residue of barium silicates such as the monobarytic silicate ($SiO_2.BaO$), the bibarytic silicate ($SiO_2.2BaO$) the tribarytic silicate ($SiO_2.3BaO$) and the intermediate silicates between the mono- and the bibarytic, and between the bi- and tribarytic. It is known that these barium silicates are employed in certain industries and in particular in the sugar industry; the decomposition of the bibarytic silicate and of the more basic silicates of barium, by means of water, gives barium hydrate ($BaO_2H_2$) and monobarytic silicate (as has been described in the United States Letters Patents No. 1,247,510 of November 20, 1917, and No. 1,490,769 of April 15, 1924); the barium hydrate is employed, for example, for the extraction of the sugar contained in molasses and sugary juices; the silicates utilized are produced by calcining in a furnace, at 1300°–1500° C. silica ($SiO_2$) and barium carbonate ($BaCO_3$), or by calcining in the same conditions monobarytic silicate ($SiO_2.BaO$) and barium carbonate, is suitable proportions.

Now this repeated production of the barytic silicates involves the accumulation, in the product, of an excessive quantity of silica and sometimes of alumina, which, by combining with the baryta, affect the qualities of the barium silicates. These impurities are due, for instance, to the refractory materials of the furnace and to the impurities contained in the substances treated (molasses, for example). When this accumulation of silica and alumina in the barytic silicates exceeds a certain limit, it is advisable to eliminate the silica and alumina which are in excess, in order to restore their original qualities to the repeatedly formed barium silicates.

In order to do this, the following process will be employed: The tribarytic, bibarytic, monobarytic silicates, the silicates intermediate between the tri- and the bibarytic and between the bibarytic and the monobarytic, charged with impurities, are ground under water and the liquid paste obtained is delivered to carbonation apparatus similar to those employed in the sugar industry.

Under the action of the carbonic acid, the following reactions occur:—

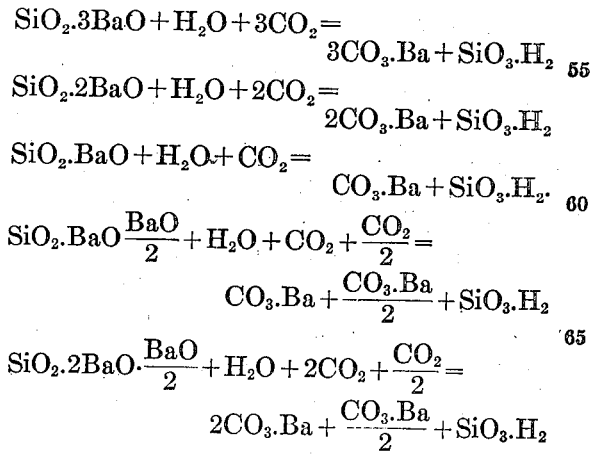

It is seen here, contrary to expectation, that the carbonic acid has the property of decomposing the barium silicates so as to transform them into carbonate of baryta and gelatinous silica.

The separation of the gelatinous silica from the precipitated carbonate of baryta is effected by one of the known processes, for example, by treating the carbonated mass with caustic soda or potash; the silica is transformed into soluble silicate which is removed by washing, decantation or filtration.

The alumina, having formed aluminates of baryta, has been liberated at the same time as the silica by the carbonic acid and the caustic soda or potash has transformed them into soluble alkali aluminates which are removed at the same time as the alkali silicates.

After this separation of the silica and the alumina, the barium silicate utilized (bibarytic, tribarytic or an intermediate silicate) may be formed again, as has been indicated above.

In certain industries which utilize the barium silicates, and in particular the sugar industry, it is not necessary to remove completely the silica and alumina; the action of the carbonic acid will be stopped when testing samples will have shown that the silica still combined is, relatively to the element barium, in the quantity desired in order that the ca¹- cining of the mixture shall furnish a barium silicate having its original properties.

In the following claims silica alone is mentioned as being separated from barium carbonate after having been liberated by the action of carbonate acid, but it is to be understood that when alumina is likewise present it also is liberated being separated from the barium carbonate along with the silica.

What I claim is:

1. A process for recovering barium as barium carbonate from barium silicates containing silica, consisting in grinding the same with water, subjecting the mixture to the action of carbonic acid, and separating from the barium carbonate the gelatinous silica thus set free.

2. A process for recovering barium as barium carbonate from barium silicates containing silica, consisting in grinding the same with water, subjecting the mixture to the action of carbonic acid, and separating from the barium carbonate the gelatinous silica thus set free by treating the carbonated mass with a caustic alkali, washing and filtering.

In testimony whereof I have signed my name to this specification.

CAMILLE DEGUIDE.